United States Patent
Ven Der Woning

(10) Patent No.: US 9,801,500 B2
(45) Date of Patent: Oct. 31, 2017

(54) APPARATUS FOR AGITATING LIQUID FOODSTUFF

(71) Applicant: KONINKLIJKE PHILIPS N.V., Eindhoven (NL)

(72) Inventor: Mark Ronald Ven Der Woning, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 317 days.

(21) Appl. No.: 14/413,307

(22) PCT Filed: Jul. 5, 2013

(86) PCT No.: PCT/IB2013/055507
§ 371 (c)(1),
(2) Date: Jan. 7, 2015

(87) PCT Pub. No.: WO2014/009858
PCT Pub. Date: Jan. 16, 2014

(65) Prior Publication Data
US 2015/0190015 A1 Jul. 9, 2015

Related U.S. Application Data

(60) Provisional application No. 61/670,667, filed on Jul. 12, 2012.

(51) Int. Cl.
*A47J 43/046* (2006.01)
*A47J 43/10* (2006.01)
(Continued)

(52) U.S. Cl.
CPC ......... *A47J 43/0465* (2013.01); *A47J 27/004* (2013.01); *A47J 43/1093* (2013.01); *B01F 13/0827* (2013.01); *B01F 13/0863* (2013.01)

(58) Field of Classification Search
CPC . A47J 43/0465; A47J 27/004; B01F 13/0827; B01F 13/0863
(Continued)

(56) References Cited

U.S. PATENT DOCUMENTS 6,095,676 A 8/2000 Kuan
6,719,450 B2 4/2004 Glucksman
(Continued)

FOREIGN PATENT DOCUMENTS

CN 101991373 A 3/2011
CN 102429595 A 5/2012
(Continued)

*Primary Examiner* — Charles Cooley
*Assistant Examiner* — Marc C Howell

(57) ABSTRACT

An apparatus for agitating liquid foodstuff, comprising a whisk that includes a magnetic rotor of a brushless electromotor assembly, and a main body including a liquid foodstuff container in which the whisk is receivable such that it is rotatable around a rotation axis (L) thereof, and a stator of the electromotor assembly. The stator is configured to electromagnetically drive the rotor in rotation, and includes at least one magnetic sensor configured to provide a signal that reflects positional changes of the magnetic rotor relative to the magnetic sensor. The main body also includes a controller configured to detect an initial, manually effected rotational movement of the whisk around its rotation axis from the signal of the magnetic sensor, and, once such initial movement of the whisk is detected, to operate the apparatus independent of said initial, movement.

18 Claims, 3 Drawing Sheets

(51) Int. Cl.
*A47J 27/00* (2006.01)
*B01F 13/08* (2006.01)

(58) Field of Classification Search
USPC .......................................... 366/143, 273, 274
See application file for complete search history.

(56) References Cited

U.S. PATENT DOCUMENTS

| | | | |
|---|---|---|---|
| 7,669,517 B2 | 3/2010 | Boussemart | |
| 2002/0196705 A1 | 12/2002 | Jersey | |
| 2011/0041704 A1* | 2/2011 | Feierabend | ......... A47J 43/0465 |
| | | | 99/323.1 |

FOREIGN PATENT DOCUMENTS

| | | | | |
|---|---|---|---|---|
| DE | 102009048480 A1 | | 4/2011 | |
| DE | 102012104321 A1 * | | 11/2013 | .......... A47J 43/0465 |
| WO | 2011069768 A1 | | 6/2011 | |
| WO | 2011090372 A1 | | 7/2011 | |
| WO | 2011151258 A1 | | 12/2011 | |

* cited by examiner

APPARATUS FOR AGITATING LIQUID FOODSTUFF

This application is the U.S. National Phase application under 35 U.S.C. §371 of International Application No. PCT/IB2013/055507, filed on Jul. 5, 2013, which claims the benefit of U.S. Provisional Application No. 61/670,667 filed on Jul. 12, 2012. These applications are hereby incorporated by reference herein.

FIELD OF THE INVENTION

The present invention relates to an apparatus for agitating liquid foodstuff, such as a milk frother or a cream whipper.

BACKGROUND

A whisk-based apparatus for agitating liquid foodstuff may typically include a liquid foodstuff container, a whisk that is rotatably disposed within the container, and a motor for drivingly engaging the whisk. In use, the motor may force the whisk into rotation in order to agitate any liquid foodstuff present in the container and to thus froth and/or whip it. Some apparatus may additionally include a heating or cooling element for respectively heating and cooling the liquid foodstuff while it is being agitated.

The apparatus may enable a user to set or adjust parameters of the agitation process, such as the angular velocity of the whisk, the duration of whisking, activation of the heating or cooling element, etc., by means of external controls provided on a side the device. The controls may be dedicated, such that each parameter has its own control.

SUMMARY OF THE INVENTION

One disadvantage of a known apparatus of the above-described type is the typically spatially split-up human/machine interaction. Part of this interaction may take place via the top of the apparatus, e.g. placement of the whisk in the container (in case the whisk is a loose, magnetically driven element), filling the container with liquid foodstuff, and monitoring the progress of the agitation process and the state of the liquid foodstuff, while another part of the interaction, in particular setting up the apparatus for operation, may take place via the controls on the side of the apparatus.

Another disadvantage of a known apparatus of the above-described type is the multitude of external controls which may be necessary to operate even its most basic functions. The controls may mar the design of the apparatus, and effectively prevent it from having a clean, non-technological appearance.

It is an object of the present invention to provide for a liquid foodstuff agitation apparatus with an exclusively top-oriented/spatially focussed user interface without external controls that are recognizable as such.

To this end, a first aspect of the present invention is directed to an apparatus for agitating liquid foodstuff. The apparatus includes a whisk, which comprises a liquid foodstuff agitator, and a rotor of an electromotor assembly, wherein the rotor is connected to the liquid foodstuff agitator and has at least one rotor magnet. The apparatus may further include a main body, which comprises a liquid foodstuff container, configured to at least partially receive the whisk such that the whisk is rotatable around a rotation axis thereof, and a stator of the electromotor assembly, said stator being configured to electromagnetically drive the rotor in rotation, and including at least one magnetic sensor configured to provide a signal that reflects positional changes of the at least one rotor magnet relative to the magnetic sensor. The main body further comprises a controller that is operably connected to the stator of the electromotor assembly, and that is configured to detect from the signal of the magnetic sensor an initial, manually effected rotational movement of the whisk around its rotation axis, and, once the initial, manually effected rotational movement of the whisk is detected, to operate the apparatus independent of said initial, manually effected rotational movement of the whisk.

In the apparatus according to the present invention, the functions of a liquid foodstuff agitating device conventionally operated through external user controls are accessible through the whisk. Upon use, a user may manually rotate the whisk around its rotation axis, so as to program the controller of the apparatus. The programming motion may be reminiscent of a setting dial on a vault, and the initial, manual rotation of the whisk may involve one or more complete or partial turns clockwise and/or counterclockwise around its rotation axis. Once the desired operating instructions have been given, the controller executes them. Within the apparatus, communication of the operating instructions from the whisk to the controller is effected through the electromotor assembly, in particular through electromagnetic interaction between the rotor of the assembly in the whisk and the stator of the assembly in the main body. Accordingly, the liquid foodstuff agitating apparatus may dispense with dedicated external controls, and so allow for a clean, non-technological design. As the whisk is normally accessible from above, i.e. at or via a top of the liquid foodstuff container, the apparatus may also provide for spatially focussed human/machine interaction.

The operational functions implemented in an apparatus according to the present invention may vary for different embodiments, and the extent to which the controller may be programmed, in particular via the whisk, may vary accordingly. In a simple embodiment, for instance, an on/off or 'wake-up function' may be the only operational function accessible through initial rotation of the whisk. I.e. initially manually rotating the whisk may wake the apparatus from an energy-saving stand-by mode, and switch it to an agitating mode in which the whisk is driven in rotation during a certain, predetermined period of time. Other embodiments, however, may offer multiple functions that are programmable via the whisk-interface. In such embodiments, the controller may typically be configured to detect at least one parameter of the initial, manually effected rotational movement.

Parameters of the initial, manually effected rotational movement of the whisk may, for instance, include (i) the clockwise or counterclockwise direction of (a portion of) the rotational movement around the rotation axis, (ii) the angular displacement involved in (a portion of) the rotational movement, i.e. the angle covered, (iii) a value indicative of an angular velocity of (a portion of) the rotational movement, e.g. the average angular velocity thereof, and (iv) a value indicative of a rotational acceleration of (a portion) of the rotational movement, etc.

In principle, the controller may be configured to control any operational aspect or function of the apparatus on the basis of any detected parameter of the initial, manually effected rotational movement of the whisk. Such aspects and functions may, for instance, include (i) characteristics of the forced, stator-driven rotation of the whisk, e.g. the clockwise or counterclockwise direction of the rotation and the angular velocity thereof, (ii) a timer that determines the duration of a time period during which the whisk is driven in rotation, and (iii) in case the apparatus is equipped with heating and/or cooling element to control the temperature of the liquid foodstuff in the liquid foodstuff container, the activation of the heating and/or cooling element.

In one preferred embodiment, the at least one parameter detected by the controller may include the clockwise or counter-clockwise direction of said initial, manually effected rotational movement, and the controller, in operating the apparatus dip independent of said initial, manually effected rotational movement of the whisk, may be configured to control the stator to electromagnetically drive the rotor in rotation, such that a direction of the stator-driven rotation of the rotor, and hence of the whisk, matches the direction of the initial, manually effected rotational movement. Or phrased otherwise: the controller may be configured to detect the user-initiated rotational movement of the whisk, to pick it up and to continue it. The apparatus may thus carry on the initial action of the user, and so provide for an intuitive feel.

In another preferred embodiment of the apparatus, the at least one parameter detected by the controller may include a value indicative of an angular velocity of said initial, manually effected rotational movement, and the controller, in operating the apparatus independent of said initial, manually effected rotational movement of the whisk, may be configured to control the stator to electromagnetically drive the rotor in rotation, such that an angular velocity of the stator-driven rotation of the whisk is dependent on said value. For instance, a fast user-initiated spin of the whisk, e.g. a user initiated spin having an (average) angular velocity above a certain angular velocity threshold, may result in a stator-driven rotation having an angular velocity that is greater than the angular velocity of a stator-driven rotation initiated by a slow user-initiated spin of the whisk, e.g. a user-initiated spin having an (average) angular velocity below said threshold. —Especially in such a preferred embodiment, intuitive control over the angular velocity of the whisk may be extended by additionally configuring the controller to detect a manually induced slowing of the angular velocity of a rotating whisk during operation, and, in case such a manually induced slowing is detected, to subsequently adjust, in particular decrease, the angular velocity at which the stator drives the rotor of the whisk. For example, during operation a user may slippingly engage (a grip of) the whisk between its fingers; the controller may detect the deceleration of the whisk's rotation, and interpret it as an instruction to lower the angular velocity at which the stator drives the rotor.

In yet another preferred embodiment, the apparatus may comprise a temperature control element for controlling a temperature of liquid foodstuff in the foodstuff container, e.g. a heating element or a cooling element. The controller may be operably connected to the at least one temperature control element, and, in operating the apparatus independent of initial, manually effected rotational movement of the whisk, be configured to operate the temperature control element dependent on the detected at least one parameter of said initial, manually effected rotational movement of the whisk. The detected at least one parameter may in particular include the clockwise or counter-clockwise direction of the initial, manually effected rotational movement of the whisk. Accordingly, an initial clockwise spin may be associated with warm agitation of the liquid foodstuff, for instance because the clockwise spin causes the controller to activate the heating element or not to activate the cooling element, while an initial counterclockwise spin may be associated with cold agitation of the liquid foodstuff, for instance because the counterclockwise spin causes the controller to activate the cooling element or not to activate the heating element; or vice versa.

In an embodiment, the whisk may be a loose component of the apparatus that is separable from the main body thereof, and include an elongate shaft, having a first end that is connected to the rotor, and a second end that defines a hand grip. In such an embodiment, the whisk may not only fulfill the functions of whisk and user control, but also serve as a scoop by means of which the agitated liquid foodstuff, e.g. frothed milk or cream, may be scooped from the liquid foodstuff container to, for instance, a coffee cup to be served.

In an elaborated embodiment, the apparatus may further include a lid for closing off the liquid food container, which lid may define an opening with an inner diameter that is slightly larger than the outer diameter of the elongate shaft of the whisk. The apparatus may be configured such that, when the whisk is operably rotatably received in the foodstuff container closed off by the lid, the rotor is located inside the foodstuff container at a position near the stator, while the hand grip extends outward from the foodstuff container through the opening in the lid. Accordingly, the whisk may be operated after all preparations for agitating liquid foodstuff in the liquid foodstuff container have been made, including closing off the container by means of the lid. Moreover, the hand grip may remain free of liquid foodstuff spatters during operation, as the lid shields it from the interior of the liquid foodstuff container.

To enable inspection of the liquid foodstuff during operation of apparatus/agitation, the lid may preferably be at least partly transparent.

These and other features and advantages of the invention will be more fully understood from the following detailed description of certain embodiments of the invention, taken together with the accompanying drawings, which are meant to illustrate and not to limit the invention.

DETAILED DESCRIPTION

Figure 1:
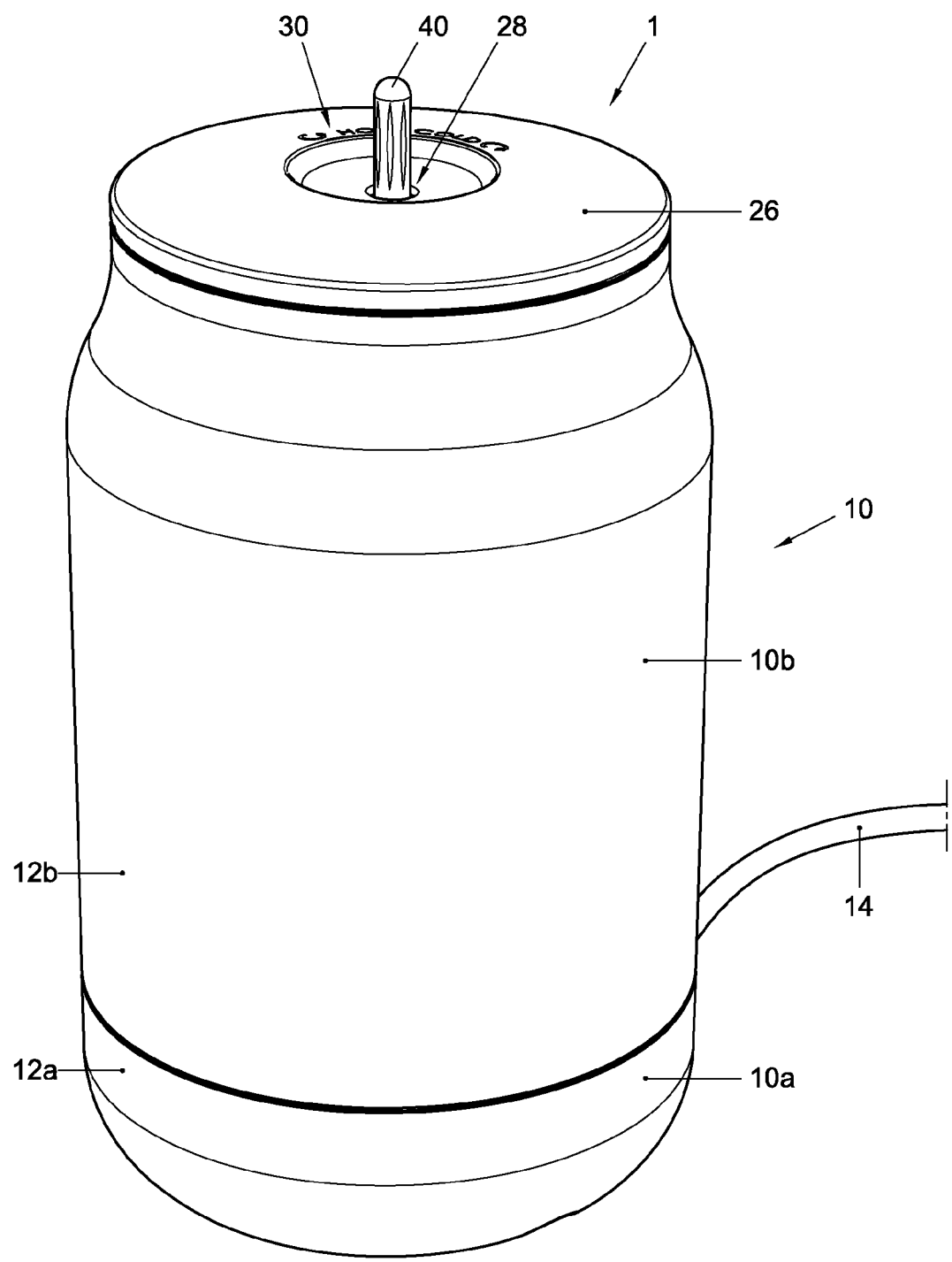
FIG. 1 is a schematic perspective view of an exemplary embodiment of an apparatus for agitating liquid foodstuff according to the present invention.
Figure 2:
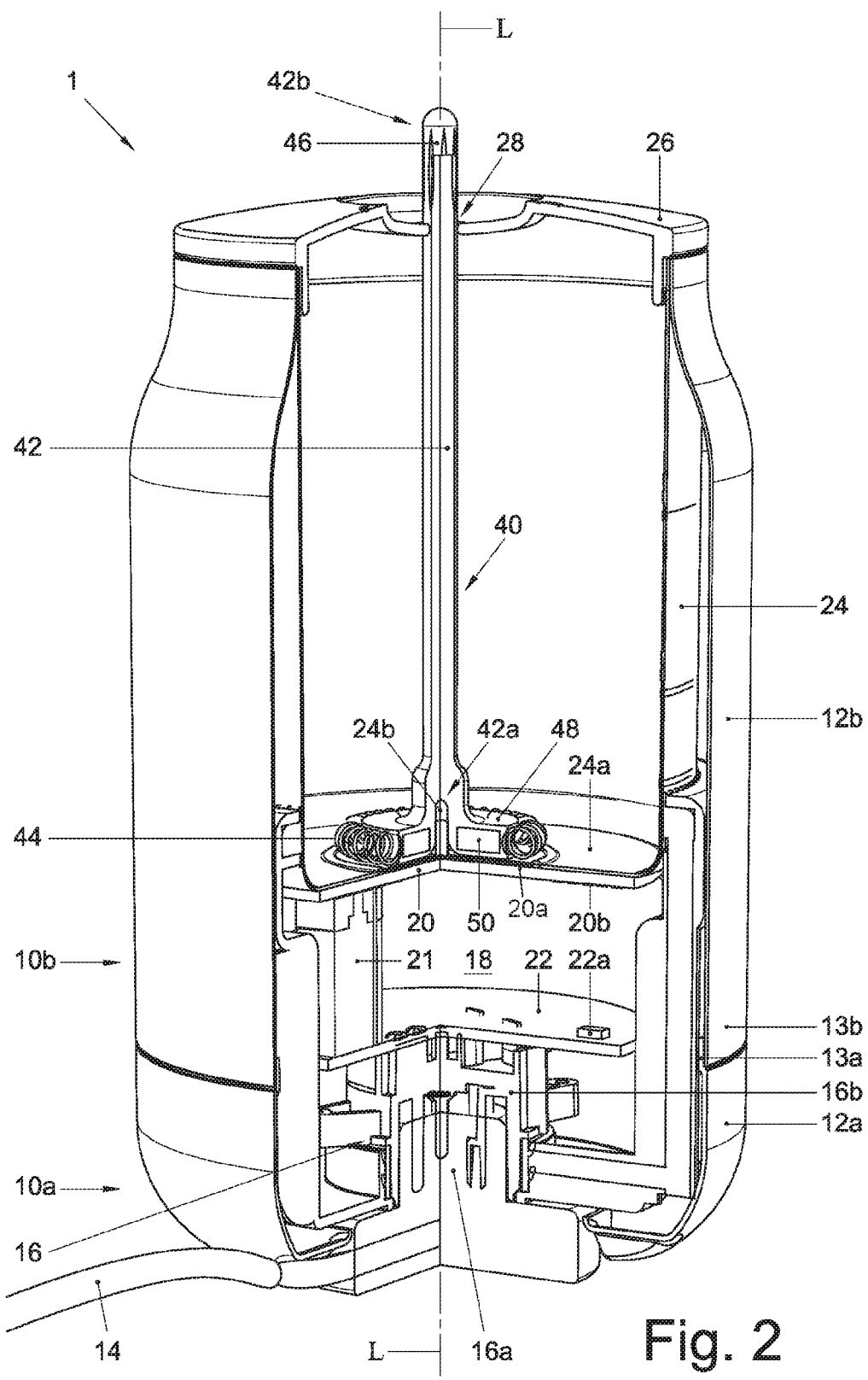
FIG. 2 is a schematic, partially cut open side view of the apparatus shown in FIG. 1.
Figure 3:
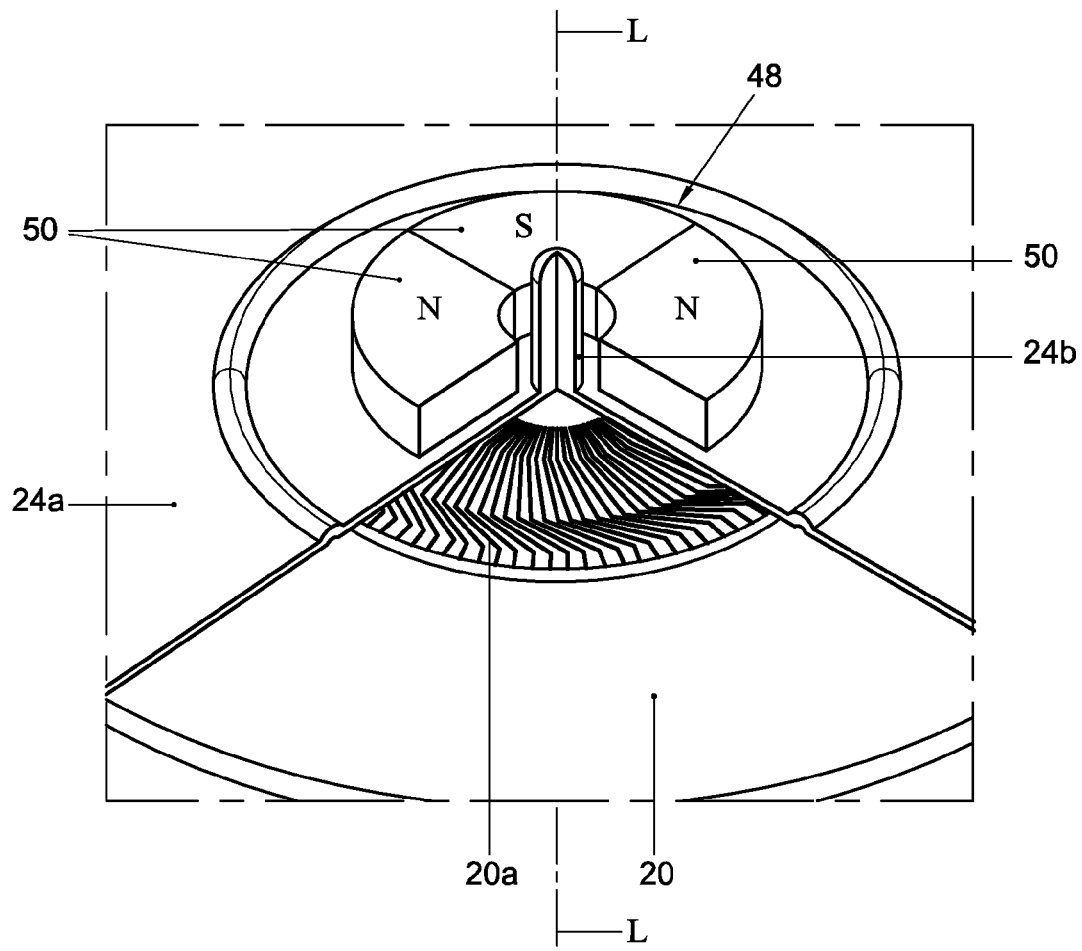
FIG. 3 is a schematic, detailed partially cut open perspective view of the stator and the rotor of the brushless electromotor assembly of the apparatus of FIGS. 1-2.

FIGS. 1-3 schematically illustrate in a perspective view, in a partially cut open side view, and a detailed partially cut open side view, respectively, an exemplary embodiment of an apparatus for agitating liquid foodstuff according to the present invention. The construction and operation of the apparatus will be clarified below in general terms, with reference to these Figures.

The liquid foodstuff agitation apparatus 1 may generally comprise two parts: a main body 10, and whisk 40.

The main body 10 may include a power base 10a, and a jug 10b that is detachably connectable to the power base 10a. When the jug 10b is positioned on the power base 10a, as in FIGS. 1 and 2, an outer, circumferential, and downwardly projecting skirt 13b on a outer wall 12b of the jug 10b may overlap with an inner, circumferential, and upwardly projecting edge 13a provided by an outer wall 12a of the power base 10a, such that the outer walls 12a,b are substantially flush with each other and the appearance of the interconnection of the two parts 10a,b of the main body 10 is characterized by a single, circumferentially extending seam. The outer walls 12a,b may have a generally cylindrical shape. In addition, the outer wall 12b of the jug 10b may preferably be handleless, and have a diameter that is easily graspable by a human hand, such that it may be lifted off the power base 10a and managed single-handedly.

The power base 10a and the jug 10b may both accommodate a respective portion 16a, 16b of an electrical connector 16; see FIG. 2. The base portion 16a of the electrical connector 16 may be shaped as a contact stub, while the jug portion 16b of the connector 16 may be provided in a recess in a bottom wall of the jug 10b, configured to receive the contact stub. When the jug 10b is positioned on the power base 10a, the two connector portions 16a,b may operatively mate and enable the transfer of electric power from the power base 10a to the jug 10b. The power base 10a may further include a power cord 14, one end of which is connected to the power base portion 16a of the electrical connector 16, and another end of which is provided with a plug (not shown) that allows the power base 10a to be connected to the mains.

As shown in FIG. 2, the outer wall 12b of the jug 10b may accommodate a generally beaker-shaped liquid foodstuff container 24, and an electronics compartment 18 that is located below a bottom wall 24a of the liquid foodstuff container 24. In order not to interfere with the operation of the electromotor assembly expounded below, the liquid foodstuff container 24 may preferably be manufactured from a non-magnetizable material, e.g. (austenitic) stainless steel. The bottom wall 24a may define a centrally positioned, upwardly protruding stud 24b that may serve as a center pin 24b for the whisk 40. The liquid foodstuff container 24 may be closable by a detachable lid or cover 26, which may define a center opening 28 that is positioned (straight) above the center pin 24b. An inner diameter of the opening 28 may be slightly larger than an outer diameter of an elongate shaft 42 of the whisk 40, such that the elongate shaft may extend through the opening 28, as shown in FIGS. 1 and 2.

The electronics compartment 18 in the jug 10b may partially accommodate the jug portion 16b of the electrical connector 16 referred to above. It may further accommodate two printed circuit boards (PCBs) 20, 22, which may be operatively interconnected through an electric connection assembly 21. The connector's jug portion 16b may be mounted on a lower side of a first of the two PCBs 22, while a (micro)controller 22a may be mounted on an upper side thereof. A second of the PCBs 20, which may be provided against an underside of the bottom wall 24a of the liquid foodstuff container 24, may, inter alia, define or position stator components of the electromotor assembly to be expounded below, and a heating and/or cooling element 20b, such as for instance a Peltier device, or, as in the depicted embodiment, an electric resistance heating element.

The whisk 40 of the apparatus 1 may be a loose component, separable from the main body 10. It may be configured to be at least partially receivable within the liquid foodstuff container 24, such that—in a received condition—it is rotatable around a rotation axis L. The whisk 40 may include an elongate shaft 42, centered on the rotation axis L, and having a first, lower end 42a and a second, upper end 42b. At its lower end 42a, the shaft 42 may connect to a rotor 48 of the electromotor assembly, and to a liquid foodstuff agitator 44, such as a toroidal coil, a wire whisk, or the like.

In the depicted embodiment, the liquid foodstuff agitator 44 includes a toroidal coil that immediately connects to and circumferentially extends around the rotor 48, which in turn immediately connects to the lower end 42a of the shaft 42. The rotor 48 may be a generally ring- or disc-shaped body, and define a centrally positioned passage or bottom recess for reception of the center pin 24b protruding from the bottom wall 24a of the liquid foodstuff container 24. The upper end 42b of the whisk's shaft 24 may define a grip or handle 46, and the whisk 40 may be dimensioned such that, when the whisk 40 is operably rotatably received in the liquid foodstuff container 24, the upper end 42b of the whisk 40 extends outwardly through the central opening 28 provided in the lid 26, and the hand grip 46 is accessible to a user.

As already mentioned above, the apparatus 1 may further include a preferably brushless electromotor assembly, including a rotor 48 and a stator 20a. For the exemplary embodiment of the apparatus 1 shown in FIGS. 1-2, the electromotor assembly is schematically depicted in the detailed and partially cut open perspective view of FIG. 3.

The rotor 48 of the electromotor assembly may be at least partially embodied by the whisk 40, and, in order to enable it to be magnetically driven by the stator 20a, include at least one magnet 50. For constructional simplicity, the at least one magnet 50 may preferably comprise one or more permanent magnets, but the use of one or more electromagnets is also contemplated. In a preferred embodiment the rotor 48 may include a plurality of alternatingly poled permanent magnets, which may be circumferentially arranged around the rotation axis L of the rotor 48, such that, seen in the circumferential direction, a north pole of a first magnet lies adjacent to a south pole of a second magnet, which in turn lies adjacent to a north pole of a third magnet, etc. In the embodiment of FIGS. 1-2, the rotor 48 includes a magnetic, generally ring-shaped body that defines such a circumferential arrangement of four permanent magnets 50, three of which are visible in FIG. 3.

The stator 20a of the electromotor assembly may be configured to electromagnetically drive the rotor 48 in rotation around its rotation axis L, and to that end include an electric coil unit. The electric coil unit may comprise at least one electric coil, such as one or more conventional wound coils and/or printed coils. The depicted embodiment of the apparatus 1 employs printed coils, which may, for instance, be constituted by a laminated structure including a plurality of stacked printed coil sheets. The stator 20a may further include a magnetic sensor positioned and configured to detect changes in the rotational/angular position of the (at least one magnet 50 of the) rotor 48. The magnetic sensor may include a Hall effect sensor, a magneto-resistance element, or, as in the depicted embodiment, at least one electric pickup coil that is integrated into the electric coil unit. Both the electric coil unit and the magnetic sensor (if separate from the electric coil unit) of the stator 20a may be operably connected to the controller 22a. To drive the rotor 48 into rotation around the rotation axis L, the controller 22a may be configured to suitably power the electric coils of the electric coil unit, thereby switching the current supplied to the electric coils based on the signal produced by the magnetic sensor.—It is noted that the term 'stator' as used in this text need not necessarily refer to a completely static entity. That is, in some embodiments the stator 20a may include components that are movable relative to other parts of the main body 10. In one such embodiment, for instance, the stator 20a may include a second rotor. This second rotor may be rotatably mounted inside the electronics compartment 18, be similar to the rotor 48 implemented in the whisk 40, and be magnetically couplable thereto, such that, when the second rotor is driven in rotation around the rotation axis L, the rotor 48 in the whisk 40 may follow its movement. It is understood that the stator's magnetic sensor in such an embodiment may detect changes in the rotational/angular position of the rotor 48 indirectly by observing changes in the rotational/angular position of the second rotor.

In the apparatus 1 according to the present invention, the functions of a liquid foodstuff agitating device conventionally operated through external user controls may be accessible through the whisk 40. Upon use, a user may rotationally move or turn the whisk 40 around its rotation axis L, so as to program the controller 22a. The programming motion may be reminiscent of a setting dial on a vault, and the rotational movement of the whisk 40 may involve a single complete or partial turn clock- or counterclockwise around its rotation axis L, or, in the case of a composite rotational movement, a plurality of consecutive complete or partial turns clockwise and/or counterclockwise around its rotation axis L. Once the desired operating instructions have been given, the controller 22a may execute them. Within the apparatus 1, communication of the operating instructions from the whisk 40 to the controller 33a may be effected through the electromotor assembly, in particular through electromagnetic interaction between the rotor 48 in the whisk 40 and the stator in the main body 10. Accordingly, the liquid foodstuff agitating apparatus 1 may dispense with dedicated external controls, and so allow for a clean, non-technological design (see FIG. 1). As the whisk 40 is accessible at the top of the liquid foodstuff container 24, the apparatus 1 may also provide for spatially focussed human/machine interaction.

The operational functions implemented in the apparatus according to the present invention may vary for different embodiments, and the extent to which the controller 22a may be programmed, in particular via the whisk 40, may vary accordingly. In a simple embodiment, for instance, an on/off or 'wake-up function' may be the only operational function accessible through rotational movement of the whisk 40. I.e. initially manually rotationally moving the whisk 40 may wake the apparatus 1 from an energy-saving stand-by mode, and switch it to an agitating mode in which the whisk 40 is driven in rotation during a certain, predetermined period of time. Other embodiments, however, may offer multiple functions that are programmable via the whisk-interface. In such embodiments, the controller 22a may typically be configured to detect at least one parameter of the initial, manually effected rotational movement in detecting the initial, manually effected rotational movement of the whisk around its rotation axis L.

Parameters of the initial, manually effected rotational movement of the whisk 40 may, for instance, include (i) the clockwise or counterclockwise direction of (a portion of) the rotational movement around the rotation axis L, (ii) the angular displacement involved in (a portion of) the rotational movement, i.e. the angle covered, (iii) a value indicative of an angular velocity of (a portion of) the rotational movement, e.g. the average angular velocity thereof, and (iv) a value indicative of a rotational acceleration of (a portion) of the rotational movement, etc.—For example, when a composite initial, manually effected motion of the whisk 40 comprises two oppositely directed partial turns around its rotation axis L, relevant parameters may include the clock- or counterclockwise direction of the first partial turn, and the angular velocity of the second partial turn.

In principle, the controller 22a may be configured to control any operational aspect or function of the apparatus on the basis 1 of any detected parameter of the initial, manually effected rotational movement of the whisk 40. Such aspects and functions may, for instance, include (i) characteristics of the forced, stator-driven rotation of the whisk 40, e.g. the clockwise or counterclockwise direction of the rotation and the angular velocity thereof, (ii) a timer that determines the duration of a time period during which the whisk is driven in rotation, and (iii) in case the apparatus is equipped with heating and/or cooling element 20b to control the temperature of the liquid foodstuff in the liquid foodstuff container 24, the activation of the heating and/or cooling element 20b.

In the embodiment of FIGS. 1-3, the controller 22a is programmable by a single (i.e. non-composite), manually effected rotational movement of the whisk 40. The at least one parameter detected by the controller 22a includes the clockwise or counter-clockwise direction of the initial rotational movement. Upon detection of the initial, rotational movement, the controller 22a is configured to control the stator 20a to electromagnetically drive the rotor 48 of the whisk 40 in rotation, such that a direction of the stator-driven rotation of the rotor 48, and hence of the whisk 40, matches the direction of the initial, manually effected rotational movement.

In addition, the controller 22a is configured to operate the temperature control element 20b—in the embodiment of FIGS. 1-3: a printed electric resistance heating coil-dependent on the clockwise or counter-clockwise direction of the initial, manually effected rotational movement of the whisk 40. As indicated by the imprint 30 on the lid 26 (see FIG. 1), a counterclockwise initial rotation of the whisk 40 will cause the controller 22a to activate the temperature control element 20b and thus to heat the liquid foodstuff container 24, while a counterclockwise initial rotation of the whisk 40 will cause the controller 22a not to activate temperature control element 20b.

During use of the depicted embodiment of the apparatus 1, a user may fill the open liquid foodstuff container 24 with, for instance, milk to be frothed. He may then position the whisk 40 in the liquid foodstuff container by means of the elongate shaft 42 thereof, such that the center pin 24b is received in the central recess of the rotor 48, and without getting his fingers dirty with milk, and subsequently place the lid 26 on top of the liquid foodstuff container 24 to close it. After these preparations, he may wake the apparatus up from standby and simultaneously program the controller 22a by engaging the hand grip 46 of the whisk 40, which is freely accessible at the top of the apparatus, and turning it in the desired hot/cold agitation direction. The controller 22a will detect the direction of this initial, manually effected rotational movement of the whisk 40, power the stator 20a to drive the rotor 48 into rotation in the detected direction and so take over the initial whisk motion, and, in case this direction is counterclockwise, additionally activate the temperature control element 20b to heat the liquid foodstuff container 24 and the milk therein, all for a predetermined/preprogrammed period of time.

Although illustrative embodiments of the present invention have been described above, in part with reference to the accompanying drawings, it is to be understood that the invention is not limited to these embodiments. Variations to the disclosed embodiments can be understood and effected by those skilled in the art in practicing the claimed invention, from a study of the drawings, the disclosure, and the appended claims. Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, it is noted that particular features, structures, or characteristics of one or more embodiments may be combined in any suitable manner to form new, not explicitly described embodiments.

LIST OF ELEMENTS 1 apparatus for agitating liquid foodstuff/milk frother
10 main body
10a,b power base (a) and jug (b) of main body
12a,b outer wall of power base (a) and of jug (b)
13a,b upstanding edge on power base (a) and skirt on jug (b)
14 power cord
16 electrical connector
16a,b base portion (a) and jug (b) of connector
18 electronics compartment in jug
20 PCB with coils and heater/cooling element
20a stator/electric coil unit
20b printed heating/cooling element
21 connection assembly
22 control PCB
22a (micro)controller
24 liquid foodstuff container
24a bottom wall of liquid foodstuff container
24b rotor center pin
26 lid
28 central hole in lid
30 imprint on lid
40 whisk
42 shaft
42a,b lower (a) and upper (b) end of shaft
44 liquid foodstuff agitator
46 grip at upper end of shaft
48 rotor at lower end of shaft
50 permanent rotor magnet
L central axis/whisk rotation axis

The invention claimed is:

1. An apparatus for agitating liquid foodstuff, the apparatus comprising:
   a whisk, including:
      a liquid foodstuff agitator;
      a rotor of an electromotor assembly, wherein the rotor is connected to the liquid foodstuff agitator, and includes at least one rotor magnet;
   a main body, including:
      a liquid foodstuff container, configured to at least partially receive the whisk such that the whisk is rotatable around a rotation axis thereof;
      a stator of the electromotor assembly, said stator being configured to electromagnetically drive the rotor in rotation, and including at least one magnetic sensor configured to provide a signal that reflects positional changes of the at least one rotor magnet relative to the magnetic sensor; and
      a controller, operably connected to the stator of the electromotor assembly, and configured
         to detect an initial, manually effected rotational movement of the whisk around the rotation axis from the signal of the magnetic sensor; and
         once the initial, manually effected rotational movement of the whisk is detected, to operate the apparatus independent of said initial, manually effected rotational movement of the whisk.

2. The apparatus according to claim 1, wherein the controller, in detecting the initial, manually effected rotational movement of the whisk around the rotation axis, is configured to detect at least one parameter of said initial, manually effected rotational movement.

3. The apparatus according to claim 2, wherein the whisk is rotatable around the rotation axis in a clockwise direction and a counterclockwise direction, and
   wherein the at least one parameter includes the clockwise or counter-clockwise direction of said initial, manually effected rotational movement.

4. The apparatus according to claim 3, wherein the controller, in operating the apparatus independent of said initial, manually effected rotational movement of the whisk, is configured to control the stator to electromagnetically drive the rotor in rotation, such that a direction of the stator-driven rotation of the whisk matches the direction of the initial, manually effected rotational movement of the whisk.

5. The apparatus according to claim 2, wherein the at least one parameter includes a value indicative of the angular velocity of said initial, manually effected rotational movement around the rotation axis.

6. The apparatus according to claim 5, wherein the controller, in operating the apparatus independent of said initial, manually effected rotational movement of the whisk, is configured to control the stator to electromagnetically drive the rotor in rotation, such that an angular velocity of the stator-driven rotation of the whisk is dependent on said value.

7. The apparatus according to claim 2, wherein the apparatus further comprises at least one temperature control element for controlling a temperature of liquid foodstuff in the foodstuff container, and
   wherein the controller is operably connected to the at least one temperature control element, and, in operating the apparatus independent of said initial, manually effected rotational movement of the whisk, configured to operate the temperature control element dependent on the detected at least one parameter of said initial, manually effected rotational movement of the whisk.

8. The apparatus according to claim 7, wherein the detected at least one parameter of said initial, manually effected rotational movement dependent on which the at least one temperature control element is operated includes the clockwise or counter-clockwise direction of said initial, manually effected rotational movement of the whisk.

9. The apparatus according to claim 1, wherein the whisk includes an elongate shaft having a first end that is connected to the rotor and a second end that defines a hand grip, and
   wherein the apparatus further includes a lid for closing off the liquid food container, wherein said lid defines an opening, such that, when the whisk is operably received in the foodstuff container closed off by the lid, the rotor is located inside the foodstuff container at a position near the stator, and the hand grip extends outward from the foodstuff container through the opening in the lid.

10. The apparatus according to claim 9, wherein the lid is at least partially transparent.

11. The apparatus according to claim 1, wherein the at least one rotor magnet of the rotor includes a plurality of permanent magnets, alternatingly poled and circumferentially arranged around the rotation axis of the whisk.

12. The apparatus according to claim 1, wherein the stator includes a plurality of printed coils.

13. The apparatus according to claim 1, wherein the magnetic sensor includes a printed coil.

14. An apparatus for agitating liquid foodstuff, the apparatus comprising:
- a liquid foodstuff agitator;
- a rotor of an electromotor assembly, wherein the rotor is connected to the liquid foodstuff agitator, and includes at least one rotor magnet;
- a liquid foodstuff container, configured to at least partially receive the liquid foodstuff agitator such that the liquid foodstuff agitator is rotatable around a rotation axis thereof;
- a stator of the electromotor assembly, said stator being configured to electromagnetically drive the rotor in rotation, and including at least one magnetic sensor configured to provide a signal that reflects positional changes of the at least one rotor magnet relative to the magnetic sensor; and
- a controller, operably connected to the stator of the electromotor assembly, and configured
    - to detect an initial, manually effected rotational movement of the liquid foodstuff agitator around the rotation axis from the signal of the magnetic sensor; and
    - once the initial, manually effected rotational movement of the liquid foodstuff agitator is detected, to operate the apparatus independent of said initial, manually effected rotational movement of the liquid foodstuff agitator.

15. The apparatus according to claim 14, wherein the controller, in operating the apparatus independent of said initial, manually effected rotational movement of the liquid foodstuff agitator, is configured to control the stator to electromagnetically drive the rotor in rotation, such that a direction of the stator-driven rotation of the liquid foodstuff agitator matches a direction of the initial, manually effected rotational movement of the liquid foodstuff agitator.

16. The apparatus according to claim 14, wherein the controller, in operating the apparatus independent of said initial, manually effected rotational movement of the liquid foodstuff agitator, is configured to control the stator to electromagnetically drive the rotor in rotation, such that an angular velocity of the stator-driven rotation of the liquid foodstuff agitator is dependent on an angular velocity of said initial, manually effected rotational movement around the rotation axis.

17. The apparatus according to claim 14, wherein the apparatus further comprises at least one temperature control element for controlling a temperature of liquid foodstuff in the foodstuff container, and
- wherein the controller is operably connected to the at least one temperature control element, and, in operating the apparatus independent of said initial, manually effected rotational movement of the liquid foodstuff agitator, configured to operate the temperature control element dependent on a detected at least one parameter of said initial, manually effected rotational movement of the liquid foodstuff agitator.

18. The apparatus according to claim 17, wherein the detected at least one parameter of said initial, manually effected rotational movement dependent on which the at least one temperature control element is operated includes the clockwise or counter-clockwise direction of said initial, manually effected rotational movement of the liquid foodstuff agitator.

* * * * *